United States Patent [19]

Lees

[11] Patent Number: 4,461,983

[45] Date of Patent: Jul. 24, 1984

[54] STABILIZING A TRANSDUCER OUTPUT

[75] Inventor: Roger T. Lees, Rickmansworth, England

[73] Assignee: Eastman Kodak Company, Rochester, N.Y.

[21] Appl. No.: 434,692

[22] Filed: Oct. 15, 1982

[51] Int. Cl.³ .............................................. H01J 29/52
[52] U.S. Cl. ...................................... 315/383; 358/74
[58] Field of Search ........................... 315/10, 30, 383; 358/74, 168, 174

[56] References Cited

U.S. PATENT DOCUMENTS 4,387,390 6/1983 Reneau et al. ........................ 358/74
4,387,403 6/1983 Van Buul ............................... 358/74

OTHER PUBLICATIONS

B.B.C. Research Department report PH-22, 1968/38, "Control of the Picture Display in Colour Film Recording Equipment".

Primary Examiner—Theodore M. Blum
Attorney, Agent, or Firm—David M. Woods

[57] ABSTRACT

The output delivered by a transducer having an integral power law transfer characteristic is stabilized by controlling output signal components related to the operating bias and gain of the transducer circuit. A test input signal comprising a sine-wave is applied to the transducer. The fundamental and integral harmonic components are filtered from the resulting output signal. The transducer is stabilized by restoring in sequence the amplitude of the harmonic and fundamental components to predetermined values respectively related to desired operating gain and bias conditions. A typical transducer is a cathode ray tube.

4 Claims, 1 Drawing Figure

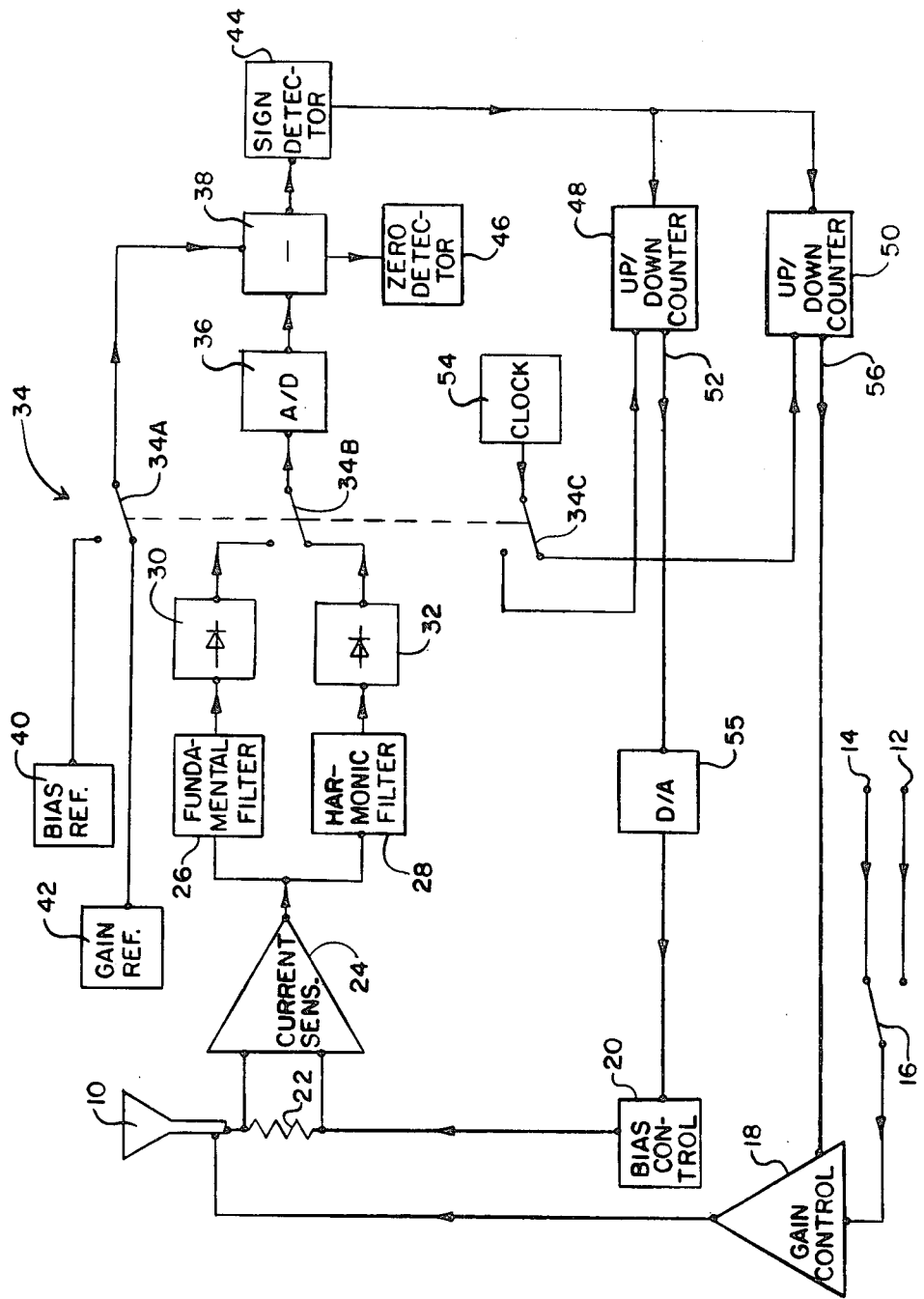

STABILIZING A TRANSDUCER OUTPUT

BACKGROUND OF THE INVENTION

1. Field of the Invention

The present invention relates to a method of stabilising an output delivered by a transducer in the case where the output is proportional to an approximately integral power of an input provided to the transducer, and to apparatus for carrying out the method.

The present invention relates especially to a method of stabilising the light output from a transducer such as a cathode-ray tube used to provide a picture display either for direct viewing or photographic exposures.

2. Description Relative to the Prior Art

Methods currently employed to control the light output from a cathode-ray tube use measurements of the cathode current or light output corresponding to two input signal levels representative of two brightness levels. It is usual to choose white and picture-black for these brightness levels. In a display system using conventional black-level clamping to control light output from a cathode-ray tube, the adjustment of black level affects the white-display conditions and the correct control settings have therefore to be approached by means of successive adjustments of the gain and black-level controls. The light output from white areas is made less dependent upon adjustments in picture black-level in the white-level clamping technique described in B.B.C. Research Department report PH-22 1968/38, "Control of the Picture Display in Colour Film Recording Equipment."

In using any of these methods, there are two variables—video gain and the bias potential of the cathode-ray tube—that are available to carry out the necessary adjustment of brightness levels and maintain the operating stability of the cathode-ray tube so as to correct its light output for long term drift. In current practice such as that described in the B.B.C. report the gain and bias corrections interact and consequently a number of operations may be necessary to reach a steady state.

SUMMARY OF THE INVENTION

According to the present invention, the output delivered by a transducer is stabilised by a method that distinguishes bias changes from gain changes, particularly in the case where the output is proportional to an approximately integral power of an input signal provided to the transducer. The method is implemented as follows:

(i) applying a sine-wave input signal to the transducer;

(ii) determining the amplitude of the integral harmonic component contained in the transducer output and restoring that amplitude to a first predetermined value; and (iii) determining the amplitude of the fundamental frequency component contained in the transducer output and restoring that amplitude to a second predetermined value.

There is also provided apparatus for carrying out the above method.

In particular the transducer may be a light source, for example a cathode-ray tube.

BRIEF DESCRIPTION OF THE DRAWING

The present invention will now be described, by way of example, with reference to the accompanying drawing which shows a block diagram of an apparatus for carrying out the present invention.

DESCRIPTION OF THE PREFERRED EMBODIMENT

Because circuits employing transducers such as cathode ray tubes in general are well known, the present description will be directed in particular to elements forming part of, or cooperating more directly with, the present invention. Elements not specifically shown or described may take various forms well known to those skilled in the art.

The light output from, for example, a cathode-ray tube, for a given signal input, is controlled by three parameters:

(1) Gamma, the index of the power law relating light output (or cathode current, to which light output is normally proportional) to driving voltage;

(2) Bias, the d.c. condition of the input signal; and (3) Gain, the effective sensitivity of the device. Under normal conditions gamma for a given cathode-ray tube does not vary but bias and gain may do so.

A sine wave signal with a fixed d.c. component added is applied to the tube and the resulting cathode current or light output is detected. The non-linearity of the tube characteristic causes the detected signal to contain harmonic components as well as a fundamental frequency component. The amplitude of the fundamental component of the output will vary with both bias and gain changes; however if the correct harmonic is chosen, the harmonic component of the output will vary only when the gain changes.

Many cathode-ray tubes have power law transfer characteristics close to square or cube law. It is shown here that for a square law tube the second harmonic is independent of bias whilst for a cube law the third harmonic has this property.

Considering firstly a cathode-ray tube having a square law characteristic:

Let the driving signal be $$V = a \sin wt + b \quad (1)$$

where a is the constant amplitude of the test sine wave of angular frequency w, and b is a constant pedestal added to it.

Let the tube transfer characteristic be $$i_c(\alpha L) = k(V + V_B)^2 \quad (2)$$

where $i_c$ is the cathode current proportional to L (the light output), k is the gain factor, and $V_B$ is the bias voltage. Both k and $V_B$ are subject to variation. Substitute for V in (2) from (1)

$$i_c = k(a \sin wt + b + V_B)^2$$

which can be re-arranged as $$i_c = -\frac{1}{2} a^2 k \cos 2wt + 2ak(b + V_B)\sin wt + k\left[\frac{1}{2} a^2 + (b + V_B)^2\right]$$

The second harmonic component of the output cathode current $i_c$ is $$-\frac{1}{2}(a^2 k \cos 2wt)$$

which is independent of $V_B$. The fundamental component of the output cathode current $i_c$ is $$2ak(b+V_B)\sin wt$$

and therefore depends both on k and $V_B$.

Secondly, considering a cathode-ray tube having a cube law characteristic: Let the signal be as before $$V = a \sin wt + b \quad (1)$$

and the tube law be $$i_c = k(V + V_B)^3 \quad (3)$$

with the parameters defined as before. Substituting for V in (3) from (1)

$$i_c = k(a \sin wt + b + V_B)^3$$

which re-arranges as $$i_c = -\frac{1}{4} ka^3 \sin 3wt - \frac{3}{2} ka^2(b + V_B)\cos 2wt +$$

$$k\left[\frac{3}{4}a^3 + 3a(b + V_B)^2\right]\sin wt +$$

$$k\left[(b + V_B)^3 + \frac{3}{2}a^2(b + V_B)\right]$$

The third harmonic component of the output cathode current $i_c$ is $$-\frac{1}{4} ka^3 \sin 3wt$$

which again is independent of $V_B$. The fundamental component of the output cathode current $i_c$, which is $$k\left[\frac{3}{4}a^3 + 3a(b + V_B)^2\right]\sin wt$$

depends both on k and $V_B$.

A gain change is therefore detected as a change in the harmonic component of the output and can be corrected by a suitable gain control element. Any departure of the fundamental component of the output from its expected value can now only be due to a bias error which can be corrected by a suitable bias control element.

When the tube law departs from a true square or cube relationship a modification is needed. Under these conditions the harmonic component of the output is no longer independent of bias; however it varies with bias only at a slow rate. By causing the circuit about to be described to repeat the cycle of operation as many times as necessary a steady state is reached. Because the departure of the tubes from exact integer power laws is normally small, say 1.8 to 2.2 for a square law and 2.7 to 3.3 for cube, the iterative procedure described above is fast and the settling time of the device is therefore short.

Referring now to the accompanying drawing, a cathode-ray tube (CRT) 10 has provision for selecting a picture signal input 12 or a test signal input 14 by means of a switch 16. The test signal input 14 is a sine-wave signal with a fixed d.c. (pedestal) component. When the test input 14 is selected, it is fed to the CRT 10 by way of a digitally controlled gain element 18. The bias of the CRT 10 is controlled by a bias control unit 20 which varies the cathode voltage. The cathode voltage is applied to the CRT through a current sensing resistor 22. The potential developed across the resistor 22 by passage of the cathode current is applied to a current sensing circuit 24.

The output from the current sensing circuit 24 is fed to a fundamental frequency filter 26 and to a harmonic filter 28 tuned to the harmonic of the fundamental frequency corresponding to the power of the transfer characteristic of the CRT. The outputs of both filters 26, 28 are fed to respective rectifiers 30, 32.

The outputs from the rectifiers 30, 32 are selected by section 34B of a ganged fundamental/harmonic selector switch 34 for feeding to an analogue to digital converter 36, thence to one input of a subtractor 38. The second input to the subtractor 38 is selected by section 34A of the fundamental/harmonic selector switch 34, and is a bias reference source 40 when the selector switch 34 has selected the fundamental filter 26, and a gain reference source 42 when the selector switch 34 has selected the harmonic filter 28.

The bias reference source 40 and the gain reference source 42 have digital outputs set to give the desired CRT operating condition.

The subtractor 38 has two outputs, the first to a sign detector 44 and the second to a zero detector 46.

The output from the sign detector 44 controls the direction of counting of two up/down counters 48, 50 which operate in the fundamental and harmonic modes respectively. The counters 48, 50 count pulses from a clock 54, the particular counter 48, 50 being selected by a section 34C of the selector switch 34.

The output 52 of the counter 48 is fed to a digital to analogue converter 55, the analogue output of which is applied to the bias control unit 20. The output 56 of the counter 50 is applied to the gain element 18 to control the gain.

When the test signal input 14 is selected by the switch 16, a test signal in the form of a low frequency sine wave superimposed on a pedestal is applied to the CRT. When the switch 34 is in the harmonic filter position the sign output from the subtractor 38 causes the selected up-down counter 50 to be driven in such a direction as to make the output of the subtractor 38 zero by varying the gain of the gain element 18. The rate of the correction is determined by the frequency of the clock 54, which frequency is low enough to allow the system to settle at each increment of the counter 50.

When the output of the subtractor 38 is zero, the switch 34 is changed to the fundamental filter position, so as to drive the counter 48, vary the bias via 55 and 20 and so make the output of the subtractor 38 again zero.

Where an exact integer power law applied, the output of the CRT 10 will now have been reset to its predetermined level, but where it is only approximately an integer power law it will be necessary to repeat the sequence until stability is achieved.

While the above description has been made with reference to a CRT, it is equally applicable to any other transducer whose output is an approximation to an integral power of the input signal.

The output of the transducer may be measured by means other than a current sensor such as described above, for example where the transducer is a light source the output may be measured by a photocell.

The invention has been described in detail with particular reference to a presently preferred embodiment thereof; but it will be understood that variations and modifications can be effected within the spirit and scope of the invention.

What is claimed is:

1. A method of stabilizing an output delivered by a transducer, the output being proportional to an approximately integral power of an input signal provided to the transducer and thereby having a harmonic component that is the same integral multiple of the frequency of the fundamental component, said method comprising the steps of:

applying a sine-wave input signal to the transducer;

determining the amplitude of the integral harmonic component contained in the transducer output;

restoring said amplitude of the integral harmonic component to a first predetermined value;

determining the amplitude of the fundamental frequency component contained in the transducer output; and restoring said amplitude of the fundamental frequency component to a second predetermined value.

2. A method of stabilizing the output delivered by a cathode ray tube (CRT) by controlling the operating bias and gain of the CRT circuit, the output being proportional to an approximately integral power of an input signal and thereby containing a harmonic component that is the integral multiple of the frequency of the fundamental component, said method comprising the steps of:

applying a sine-wave input signal to the CRT;

determining the amplitude of the integral harmonic component present in the CRT output;

restoring said amplitude of the harmonic component to a first predetermined value related to a desired operating gain;

determining the amplitude of the fundamental component present in the CRT output; and restoring said amplitude of the fundamental component to a second predetermined value related to a desired operating bias.

3. Apparatus for stabilizing the output of a transducer by controlling the operating bias and gain of the transducer circuit, said apparatus comprising:

a transducer having an approximately integral power law transfer characteristic which thereby causes harmonic components in the transducer output;

means for applying a sine-wave input signal to the transducer;

means for generating a bias voltage for biasing the transducer;

means for controlling the gain of the transducer;

means for generating an output signal proportional to the output of the transducer;

means for sensing the amplitude of the integral harmonic component present in said output signal;

means for adjusting said gain controlling means until the amplitude of the integral harmonic component attains a predetermined value related to a desired operating gain;

means for sensing the amplitude of the fundamental component present in said output signal; and means for adjusting said bias generating means until the amplitude of the fundamental component attains a predetermined value related to a desired operating bias.

4. Apparatus as claimed in claim 3 in which the transducer comprises a cathode ray tube.

* * * * *